US009990277B2

(12) United States Patent
Kim et al.

(10) Patent No.: US 9,990,277 B2
(45) Date of Patent: Jun. 5, 2018

(54) SYSTEM AND METHOD FOR EFFICIENT ADDRESS TRANSLATION OF FLASH MEMORY DEVICE

(71) Applicant: ELECTRONICS AND TELECOMMUNICATIONS RESEARCH INSTITUTE, Daejeon (KR)

(72) Inventors: Chang Soo Kim, Daejeon (KR); Hun Soon Lee, Daejeon (KR); Kyoung Hyun Park, Daejeon (KR); Mai Hai Thanh, Daejeon (KR); Mi Young Lee, Daejeon (KR); Sung Jin Hur, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 749 days.

(21) Appl. No.: 14/204,597

(22) Filed: Mar. 11, 2014

(65) Prior Publication Data

US 2015/0193339 A1 Jul. 9, 2015
US 2017/0168928 A9 Jun. 15, 2017

(30) Foreign Application Priority Data

Jan. 9, 2014 (KR) .......................... 10-2014-0002821

(51) Int. Cl.
*G06F 12/00* (2006.01)
*G06F 12/02* (2006.01)
*G06F 12/10* (2016.01)

(52) U.S. Cl.
CPC .......... *G06F 12/0246* (2013.01); *G06F 12/10* (2013.01); *G06F 2212/7201* (2013.01)

(58) Field of Classification Search
CPC ............. G06F 2212/7201; G06F 12/10; G06F 12/0246
See application file for complete search history.

(56) References Cited

U.S. PATENT DOCUMENTS 7,702,844 B2  4/2010  Chung et al.
8,195,912 B2  6/2012  Flynn et al.
(Continued)

FOREIGN PATENT DOCUMENTS

KR    10-0526188      7/2005
KR    10-2010-0089229  8/2010
(Continued)

*Primary Examiner* — Larry T Mackall
(74) *Attorney, Agent, or Firm* — Staas & Halsey LLP

(57) ABSTRACT

Disclosed are a system and a method for address translation for a flash memory device, and particularly, disclosed is a technology that is capable of efficiently performing address translation between a logical address provided to the outside of a flash memory and a physical address of an actual flash memory in managing the flash memory device. The system includes: a flash memory system writing a corresponding data page by allocating a physical address space when there is a request for writing a data page from storage clients, and performing address translation between a physical address and a logical address; and a logical address space formed between the flash memory system and the storage client to provide the logical address.

18 Claims, 12 Drawing Sheets

(56) References Cited

U.S. PATENT DOCUMENTS

| | | | |
|---|---|---|---|
| 8,645,614 B2 | 2/2014 | Jeong | |
| 2003/0165076 A1* | 9/2003 | Gorobets | G06F 3/0613 365/200 |
| 2005/0144368 A1 | 6/2005 | Chung et al. | |
| 2007/0174579 A1* | 7/2007 | Shin | G06F 12/0246 711/170 |
| 2008/0098192 A1* | 4/2008 | Im | G06F 12/0246 711/170 |
| 2008/0172523 A1* | 7/2008 | Tanaka | G06F 1/3225 711/103 |
| 2009/0150641 A1 | 6/2009 | Flynn et al. | |
| 2010/0169553 A1* | 7/2010 | Yano | G06F 12/0246 711/103 |
| 2010/0205357 A1* | 8/2010 | Mukaida | G06F 12/0246 711/103 |
| 2012/0096217 A1* | 4/2012 | Son | G06F 12/0246 711/103 |
| 2012/0110249 A1* | 5/2012 | Jeong | G06F 3/0616 711/103 |
| 2012/0166709 A1 | 6/2012 | Chun | |
| 2012/0233396 A1 | 9/2012 | Flynn et al. | |
| 2013/0080732 A1 | 3/2013 | Nellans et al. | |
| 2013/0166828 A1 | 6/2013 | Chun | |
| 2013/0185532 A1 | 7/2013 | Flynn et al. | |

FOREIGN PATENT DOCUMENTS

| | | |
|---|---|---|
| KR | 10-2012-0074707 | 7/2012 |
| WO | WO 2013/069859 | 5/2013 |

\* cited by examiner

SYSTEM AND METHOD FOR EFFICIENT ADDRESS TRANSLATION OF FLASH MEMORY DEVICE

CROSS-REFERENCE TO RELATED APPLICATIONS

This application claims priority to and the benefit of Korean Patent Application No. 10-2014-0002821 filed in the Korean Intellectual Property Office on Jan. 9, 2014, the entire contents of which are incorporated herein by reference.

TECHNICAL FIELD

The present invention relates to a system and a method for performing address translation for a flash memory device, and more particularly, to a technology that is capable of efficiently performing address translation between a logical address provided to the outside of a flash memory and a physical address of an actual flash memory in managing the flash memory device.

BACKGROUND ART

In general, a flash memory is operable with lower power than an existing hard disk and is excellent in terms of stability due to no mechanical part. Further, since the flash memory has a memory characteristic and a nonvolatile characteristic differently from a DRAM, using the flash memory as a next-generation storage device that is substituted for the hard disk is gradually increased.

However, the flash memory has a problem that as a usage time elapses, reliability deteriorates. The problem is caused by limitation of the number of use times (more particularly, the number of erase times) of the flash memory.

Moreover, the flash memory is readable/writable by the unit of a page, but when data has been written, it is impossible to overwrite data immediately (called as in-place-update). As a result, in order to overwrite new data in the flash memory, it is necessary to first erase a corresponding block constituted by several pages and thereafter, write the new data. Such a characteristic is referred to as an erase before write characteristic.

In a method for managing the flash memory, a wear-leveling operation for extending the entire life-span of a flash memory device by equally applying the number of erase times to all elements of flash memory is required. To this end, wear-leveling is performed by writing data at a new position without overwriting data at an existing data position when data is requested to be modified.

In order to perform such wear-leveling operation, mapping between a logical address which is an address which the flash memory provides to the outside and a physical address which is a position where data is actually stored in a flash memory is required. A plurality of companies that produce the flash memory device use different address translation techniques. However, a difference in address translation method causes a difference in performance, stability, life-span, and the like of the flash memory device.

SUMMARY OF THE INVENTION

The present invention has characteristics to be described below.

First, the present invention provides an efficient address translation method for solving a problem of life-span limitation which is a disadvantage of a flash memory in managing the flash memory.

Second, according to the present invention, it is possible to efficiently use a plurality of flash memory devices at the same time by solving a difference between the flash memory devices in performance, stability, and life-span, which is caused by different address translation methods of respective flash memory devices.

Third, according to the present invention, better performance, stability, and reliability can be provided than those of an existing flash memory device by providing a virtual driver through 2-stage address translation.

An exemplary embodiment of the present invention provides an address translation system for a flash memory device, including: a flash memory system writing a corresponding data page by allocating a physical address space when there is a request for writing a data page from storage clients, and performing address translation between a physical address and a logical address; and a logical address space formed between the flash memory system and the storage client to provide the logical address.

Another exemplary embodiment of the present invention provides an address translation system for a flash memory device, including: a flash memory system writing a corresponding data page by allocating a physical address space when there is a request for writing a data page from storage clients, and performing address translation between a physical address and a logical address; a first logical address space providing the logical address by regarding the logical address as the physical address; a second logical address space providing the logical address to the storage clients; and a virtual driver transmitting a trim command for a corresponding page to the flash memory system when a specific page is invalidated and translating the first logical address space to a logical address corresponding to the second logical address by regarding the first logical address space as a physical address.

Yet another exemplary embodiment of the present invention provides an address translation method for a flash memory device, including: writing data requested to be serviced from a storage client in a current page number and increasing the current page number when there is an unused page in a block to which a current written page belongs; writing a mapping information entry in a current page of a log packing block and setting the current page number to a first page of a new log packing block when mapping information entries in the log packing block constitute one page; integrating mapping information entries in a previous log packing block to configure one page size and writing the mapping information entries in a current page of a metadata log region; and invalidating pages in the previous log packing block and increasing a current page number of the metadata log region.

The present invention provides effects described below.

First, the present invention can improve performance, stability, and life-span of a flash memory system through efficient address translation.

Second, the present invention provides wear-leveling of all metadata in addition to wear-leveling of general data to extend the life-span of a flash memory device.

Third, the present invention provides a virtual driver through 2-stage address translation to complement an existing insufficient address translation method for a flash memory device, thereby improving the performance, the stability, and the life-span of the flash memory device.

Fourth, the present invention can efficiently integrate and use different types of devices by resolving different characteristics of respective devices in integrating different types of flash memory devices and using the flash memory devices simultaneously.

The exemplary embodiment of the present invention is used for an example, and various modifications, changes, substitutions, and additions can be made through the technical spirit and range of the appended claims by those skilled in the art, and it will be appreciated that the modifications and changes are included in the appended claims.

DETAILED DESCRIPTION

Hereinafter, exemplary embodiments of the present invention will be described in detail with reference to the accompanying drawings.

Figure 1:
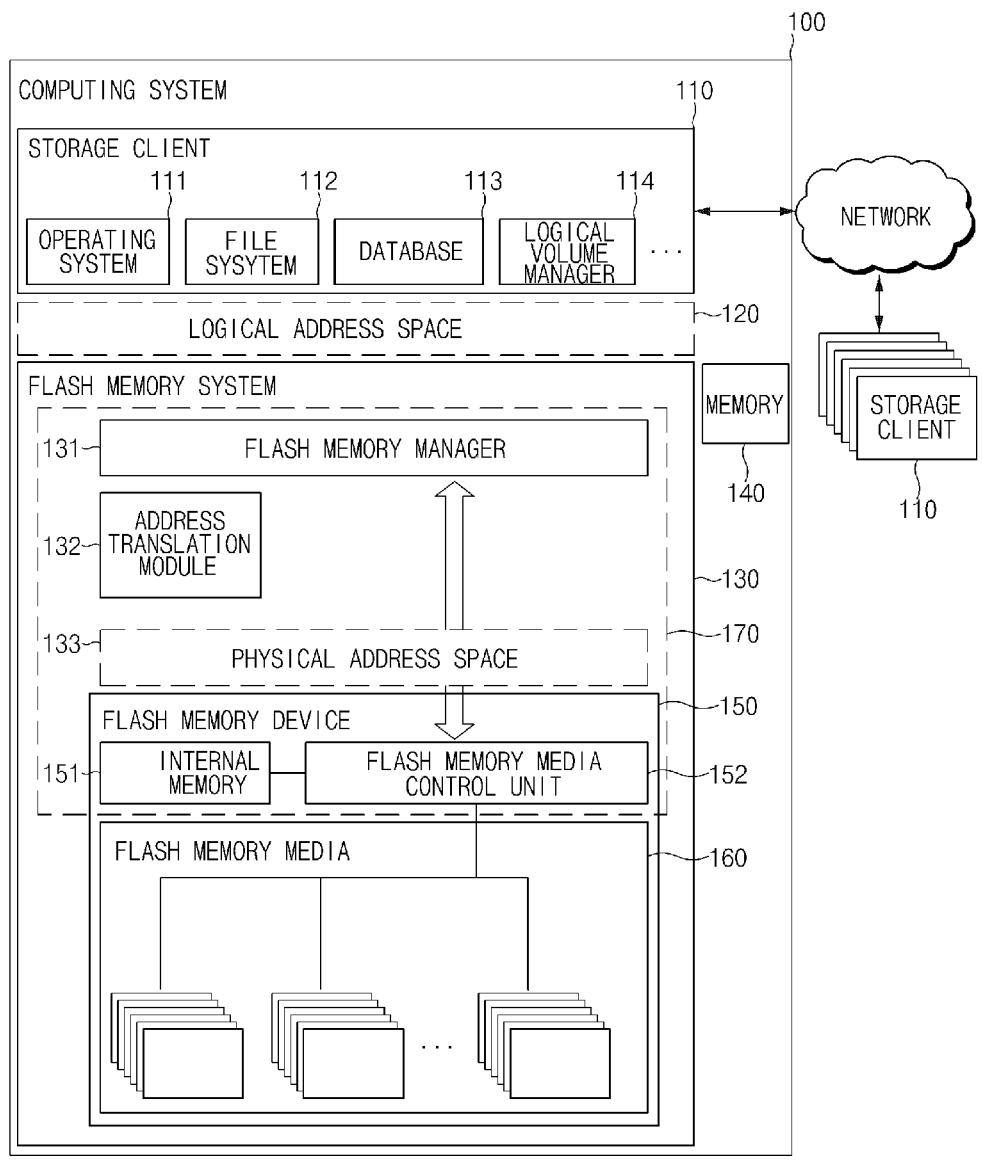
FIG. 1 is a configuration diagram of an address translation system for a flash memory device according to an exemplary embodiment of the present invention.

FIG. 1 is a configuration diagram of an address translation system for a flash memory device according to an exemplary embodiment of the present invention.

A computing system 100 includes a storage client 110, a logical address space 120, a flash memory system 130, and a memory 140.

Herein, the storage client 110 includes an operating system 111, a file system 112, a database 113, and a logical volume manager 114. In addition, the flash memory system 130 includes a flash memory manager 131, an address translation module 132, a physical address space 133, and a flash memory device 150.

The flash memory device 150 includes an internal memory 151, a flash memory media control unit 152, and a flash memory media 160. In the flash memory system 130, a region including the flash memory manager 131, the address translation module 132, the physical address space 133, the internal memory 151, and the flash memory media control unit 152 may be collectively called a flash memory control unit 170.

The computing system 100 may include a server, a personal computer, a mobile device, and the like. In addition, the various storage clients 110 including an operating system 111, a file system 112, a database 113, and a logical volume manager 114 are operated and the flash memory system 130 is used as a storage.

The storage clients 110 may be present in the system including the flash memory system 130 or may be connected through a network outside the computing system 100. Further, the flash memory system 130 may be directly connected to the computing system 100 including the storage clients 110 or may be connected to the computing system 100 through the network.

The computing system 100 includes a memory 140 which may be used by internal programs. The memory 140 may be a volatile or nonvolatile memory, and may include an SRAM, a DRAM, a magnetic resistance (MRAM), an NRAM, a phase-change random access memory (PRAM), a NAND flash, or a Nor flash, and is not particularly limited to the aforementioned memory type.

An independent logical address space 120 is provided between the storage client 110 and the flash memory system 130. In addition, an independent physical address space 133 is provided in the flash memory system 130. The physical address space 133 is managed by the flash memory manager 131 and the address translation module 132.

The flash memory manager 131 controls the flash memory device 150. The flash memory manager 131 provides the logical address space 120 to the storage clients 110 according to a control by the address translation module 132.

The address translation module 132 takes charge of translation between the logical address space 120 which the flash memory system 130 provides to the outside and the physical address space 133 which is internally used. In this case, the address translation module 132 may be included as a part of the flash memory manager 131.

The flash memory manager 131 and the address translation module 132 manage metadata for translation and mapping between the logical address and the physical address. In this case, the metadata may be managed by an internal memory 151 in the flash memory system 130 or a memory 140 outside the flash memory system 130.

The flash memory device 150 includes a plurality of flash memory media 160. In addition, the flash memory media control unit 152 controls the flash memory media 160. The flash memory media control unit 152 manages one or more flash memory media 160. Further, the flash memory device 150 provides the physical address space 133 to the outside.

Herein, the flash memory media 160 may be a NAND flash memory. In addition, the internal memory 151 may be used in the flash memory media control unit 152 or the address translation module 132.

Figure 2:
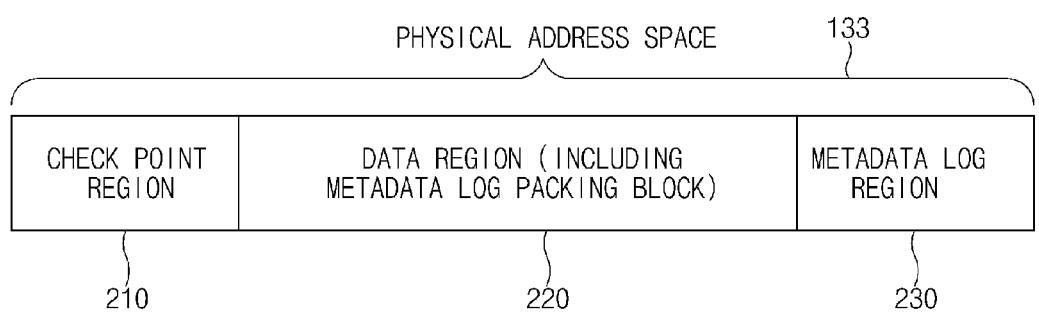
FIG. 2 is a detailed configuration diagram of a physical address space of FIG. 1.

FIG. 2 is a detailed configuration diagram of the physical address space 133 of FIG. 1.

The physical address space 133 is generally divided into three regions to be managed. That is, the physical address space 133 is divided into a check point region 210, a data region 220, and a metadata log region 230 to be managed.

One block may further be positioned as a super block in front of the check point region 210, and a total flash memory size, the number of check point region blocks, and the like may be additionally managed therein.

The data region 220 as a space for writing or extracting data requested by the storage clients 110 stores data used by the storage clients 110. When the flash memory system 130 receives a request for writing a new data page from the storage clients 110, the flash memory system 130 allocates a space for writing the corresponding data page in the physical address space 133.

In this case, in the space allocation, an empty page is allocated in the physical address space 133 so as to sequentially use all flash memories. Therefore, wear-leveling is performed. As one example, the physical address space is allocated starting from page No. 0 in a direction where a page number is gradually increased. Through such a process, whenever the storage clients request writing operations with same logical address, the logical address is changed to a new physical address. The flash memory system 130 needs to manage a relationship between the logical address and the physical address changed through such a process.

The flash memory system 130 manages mapping which is the relationship between the logical address and the physical address through the flash memory manager 131 and the address translation module 132. The flash memory system 130 manages logical-to-physical address mapping in order to rapidly process a service requested to the flash memory system 130 by the storage clients 110.

The flash memory system 130 manages also physical-to-logical address mapping for rapid garbage collection when there is no empty unused block or unused page. When there is no physical-to-logical address mapping information, all logical-to-physical address mapping information needs to be read once or more times for the garbage collection.

The mapping information is generally present in the internal memory 151 of the flash memory device 151 or the memory 140 positioned in the computing system 100 for a rapid mapping operation. There are a lot of cases in which the volatile memory is used as those memories 151 and 140. When the volatile memory is used, the mapping information may disappear upon restarting due to turn-off of a system power supply or occurrence of a problem.

Under such a situation, in order to restore the mapping information, the flash memory system 130 writes the mapping information into the flash memory device 150 periodically or when an event such as a user request, or the like occurs. This is called a checkpointing operation. The mapping information is written into the data region in the checkpointing operation, and as a result, the wear-leveling may be performed similarly as general data.

A writing position of the mapping information by the checkpointing operation is managed by the check point region 210 in the physical address space 133 of the flash memory. As one exemplary embodiment, when data which is written last is present in a 100-th page, the mapping information is written from a 101-th page and 101 which is the start page is written in the check point region 210.

The check point region 210 is also continuously updated at the same position. Then, a problem of wear-out in which the life is expired within a shorter time than other data occurs.

In order to solve the problem, one or more blocks are fixed in advance and allocated to the check point region 210 in the exemplary embodiment of the present invention. Since one block is configured of hundreds of pages or more, the mapping information is written while the pages are sequentially circulated in a circular shape every checkpointing operation of the mapping information.

A sequence number is written together with the writing position of the mapping information in order to find a last checkpointing position in restarting. When the system restarts, all of the pages are read in the predetermined check point region and the sequence number is compared to find the position of the mapping information stored last through a latest sequence number.

The number of blocks allocated for the check point region 210 may be configured by user designation or automatically by the system. In this case, a cycle of the checkpointing operation may be adjusted so that the check point region 210 has the same life-span as the general data region 220.

That is, a value acquired by dividing the number of all pages of the flash memory system 130 by the number of pages which are present in the check point region 210 becomes a check pointing cycle. Herein, the check pointing cycle is the number of writing pages in the flash memory system 130.

As one exemplary embodiment of the present invention, it is assumed that one block of the flash memory is constituted by 256 pages, the size of each page is 4 KB, and the size of the entire flash device is 1 TB. In addition, it is assumed that one block is allocated to the check point region 210. Then, the number of all pages is $1024*1024*1024*1024/(4*1024)=256*1024*1024$.

Since one block is constituted by 256 pages, 256 pages are present in the check point region 210. Therefore, the cycle of checkpointing operation is $256*1024*1024/256=1024*1024$, and thus if the checkpointing operation is performed whenever $1024*1024$ pages are written, then both checkpointing region and data region have same number of writing operations. In other words, the same level of wear-leveling for the data region 220 and the check point region 210 is achieved.

As described in the example, the flash memory system 130 may perform the checkpointing operation of the mapping information based on a relationship between the size of the check point region 210 and the checkpointing operation cycle.

Meanwhile, when there is a request for writing in the new data page after the checkpointing operation, new mapping information is continuously updated. However, the information is present in only the volatile memories 140 and 151. In this state, when the system is interrupted, the mapping information after the checkpointing operation disappears, and as a result, recovery is impossible.

In order to solve the problem, in the exemplary embodiment of the present invention, whenever the data is requested to be written in the data page, mapping information associated with the corresponding request is written in the metadata log region 230 in a log fashion. The metadata log region 230 is used in a log structure format while being circulated in a circular shape similarly as the check point region 210.

Meanwhile, in general, in the case of the flash memory, only page-unit writing is supported. Further, the size of a mapping information entry for one data page is relatively smaller than the page size. In this point, a plurality of mapping information entries may be written in the page of the metadata log region 230.

Accordingly, in the exemplary embodiment of the present invention, the mapping information entries are collected in a separate space until the mapping information entries are collected to reach one page size in order to reduce the waste of a storage space of the metadata log region 230.

When the collected mapping information entries reach one page size, the corresponding page is written in the metadata log region 230. A region where the mapping information entries are collected until the mapping information entries reach one page size is a metadata log packing block, which will be described below.

When the mapping information entries collected in the log packing block reach one page size and thereafter, the corresponding mapping information entries are written in the metadata log region 230 as one page, the corresponding log packing block is invalidated so that the garbage is collected by a garbage collector.

The size of the metadata log region 230 is determined by an equation below for same-level of wear-leveling with the data region 220, that is, for assuring the same life-span.

Size of metadata log region=(the number of data region pages)*(1/(the number of mapping information entries per flash page))

Herein, the number of mapping information entries per flash page is determined by the page size and the size of the mapping information entry. An aspect of the mapping information entry will be described below.

In another exemplary embodiment of the present invention, the size of metadata log region may further be dynamically controlled according to a use situation of the flash memory system 130 as described below in order to reduce the size of the metadata log region 230. That is, not all pages but data pages which are free or in an unused state or in an invalid state while being overwritten in other pages due to an update necessity after being recorded are subjected to the wear-leveling in the data region 220.

Accordingly, the metadata log region 230 uses the number of pages which are free or invalid within the data region instead of the number of data region pages in calculating the size of the metadata log region in order for the metadata log region 230 to perform the same wear-leveling as the data region 220. Therefore, the size of the metadata log region 230 may be further reduced.

Under a situation in which only a part of the flash memory system 130 is used, the size of the metadata log region 230 is allocated to be relatively large. Thereafter, as the flash memory system 130 is more and more used, the metadata log region 230 is gradually decreased, and as a result, the flash memory system 130 may provide more storage space to the storage clients 110.

The minimum size of the metadata log region 230 is the number of pages determined by the cycle of the checkpointing operation determined according to the number of blocks allocated to the check point region 210. This assures that at least one checkpointing operation is performed before all pages within the metadata log region 230 is used once and thus the metadata log region 230 is reused again.

Figure 3:
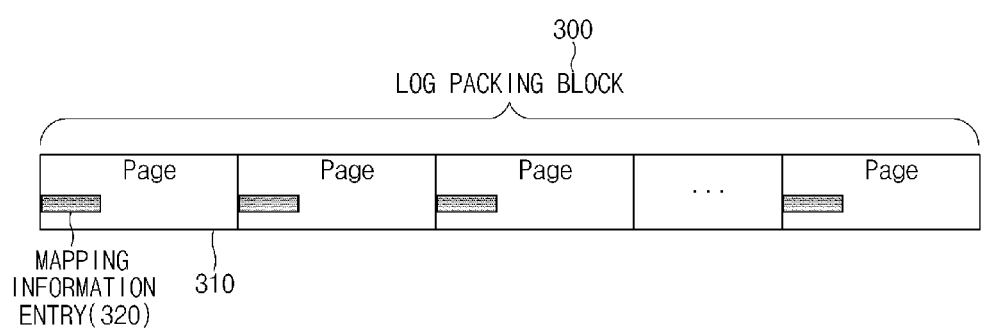
FIG. 3 is a configuration diagram of a log packing block in a data region of FIG. 2.

FIG. 3 is a configuration diagram of the log packing block 300 in the data region 220 mentioned in FIG. 2.

The log packing block 300 is used by allocating one block of which the entirety is empty in a similar method as general data in the data region 220. The position of the log packing block 300 is continuously changed in the data region 220 with time. Since all flash memory spaces are used in a sequential method in a direction in which the physical address increases, an empty block may be easily found. From this, the log packing block 300 may have same level of wear-leveling as the general data. The position of the log packing block 300 is managed through the mapping information similarly as a storage position of the general data.

Hereinafter, this point is mentioned in more detail when the structure of the mapping information is described below.

The flash memory media 160 in the flash memory system 130 are produced to have by-channel parallelism and in-channel parallelism. Therefore, by considering this point, a block which is positioned at a location separated from a page in which the general data is written may be selected as the log packing block 300 in the data region 220.

The log packing block 300 writes only one mapping information entry 320 in each page 310 of the corresponding block. When entries (alternatively, pages of a corresponding number) of a predetermined number (the number of mapping information entries per page) are collected in the log packing block 300, a new log packing block 300 is allocated and the corresponding mapping information entries 320 are collected to form one page 310 to be written in the metadata log region 230.

When writing data in the metadata log region 230 is completed, the previous log packing block 300 becomes invalid. In addition, the previous log packing block 300 becomes an unused block immediately or afterwards by the garbage collection operation. Herein, in allocation of the log packing block 300, several extra blocks may be allocated in advance to be managed for improving performance.

Figure 4:
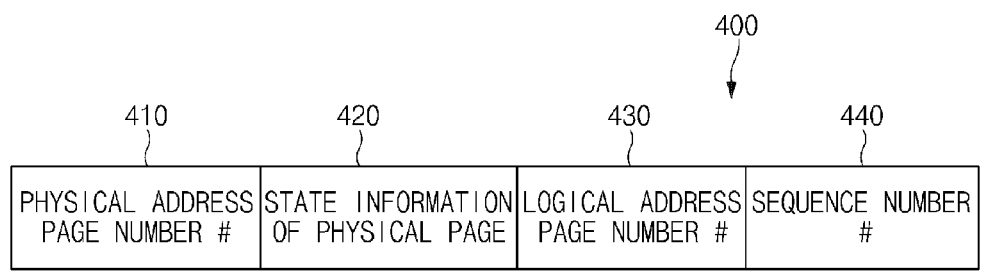
FIG. 4 is a diagram illustrating a structure of a mapping information entry of FIG. 3.

FIG. 4 illustrates a structure of each mapping information entry 400 stored in the metadata log region 230 and the log packing block 300.

The mapping information entry 400 includes a physical address page number 410 associated with the corresponding mapping information, state information 420 of a corresponding physical page, a logical address page number 430 corresponding to a corresponding physical address, and a sequence number 440 corresponding to a corresponding mapping entry.

When the storage clients 110 requests to write data providing the logical address, the flash memory system 130 allocates a new physical page and the corresponding mapping information entry 400 is written. Besides, in every case in which new mapping is required, which include invalidating of a physical page, a garbage collection operation, a block erase operation, allocation of the log packing block 300, and the like, the mapping information entry is written.

The physical address page number 410 and the logical address page number 430 set a relationship between the physical address and the logical address for the corresponding operation. The state information 420 of the physical page indicates a state of the corresponding physical page and as a representative state, unused or free, used, invalid type information is written. Besides, various state information may be stored together.

The sequence number 440 represents a sequence of various operations performed by the flash memory system 130. The flash memory system 130 may maintain an accurate operation result even under a multi-processor or multi thread environment through the sequence number 440. A sequence number of the checkpointing region 210 and a sequence number in the mapping information are also used to recover various information.

As the logical address page number 430 which is associated with the log packing block 300, a special number is used. As one embodiment, as the logical address page number 430, "0xffffffff . . . fff" may be used.

As one exemplary embodiment of the present invention, the physical address page number 410 may adopt 7 bytes (56 bits), the physical page state information 420 may adopt 1 byte, the logical address page number 430 may adopt 8 bytes (64 bits), and the sequence number 440 may adopt 4 bytes (32 bits).

In this case, since the logical address page number 430 is 8 bytes, the logical address page number 430 may cover all address spaces which may be expressed in a 64 bit system. On the contrary, since a storage space provided by the actual flash memory system 130 is limited, the logical address page number 430 may be used as a sparse address space.

However, a data size of the mapping information entry 400 according to the exemplary embodiment of the present invention is not limited thereto, but may be variously modified and herein, is presented as one example.

Figure 5:
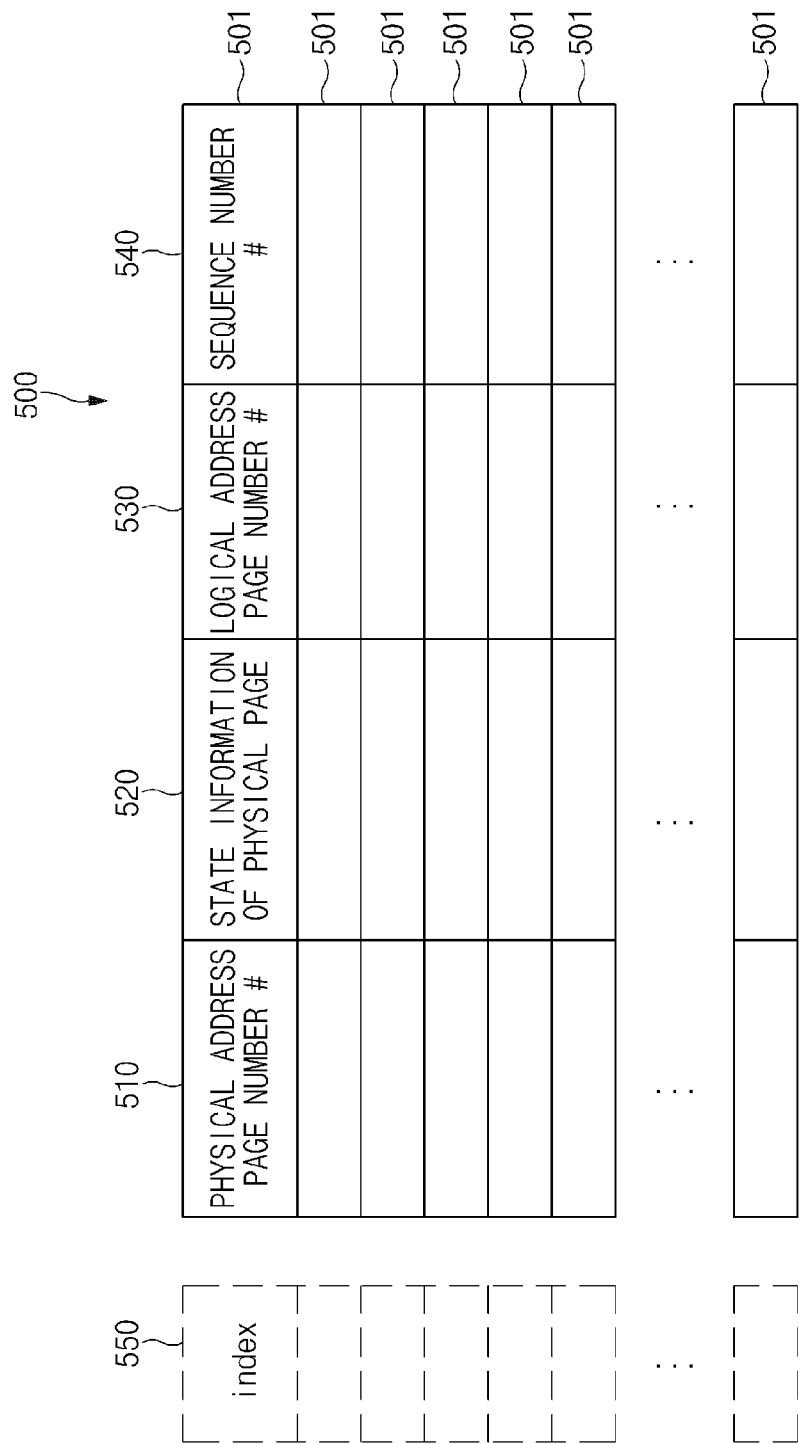
FIG. 5 is a diagram illustrating a structure of mapping information in the mapping information entry of FIG. 3.

FIG. 5 is a diagram illustrating a structure of the mapping information 500 in the mapping information entry 320 of FIG. 3.

The mapping information 500 is stored in the memory 140 of the computing system 100 or the internal memory 151 of the flash memory device 150 in order to rapidly perform the mapping operation between the logical address and the physical address. Further, the mapping information 500 is written in the flash memory media 160 in the checkpointing operation.

The amount of the mapping information 500 increases as the storage space provided by the flash memory system 130 increases. Accordingly, some of the mapping information 500 may be loaded on the memory 140 or 151 or written in the flash memory media 160 as necessary according to the size of the memory 140 or 151.

A mapping information index 550 in the mapping information 500 may be used in two types.

In a first type, the logical address is translated into the physical address when the storage clients 110 provide the logical address while requesting the operation to the flash memory system 130. In this case, a corresponding index number becomes a logical address page number 530. In this case, an address translation result of the logical address to the physical address is the physical address page number 510 in an entry 501 corresponding to a logical page number with the index number 550 in the mapping information 500.

In a second type, a state of the physical page storing previous data intends to be invalid by a request for overwriting data or the state of physical page intends to be checked based on a specific physical address for the garbage collection. In this case, the corresponding index number 550 becomes the physical address page number 510. An operation of changing or reading the state information of the physical page in the mapping entry 501 indicated by the corresponding physical address page number 510 is performed. Further, the logical address page number 530 in the corresponding entry is a logical page number corresponding to the corresponding physical page.

The description in the present invention is one exemplary embodiment and as another exemplary embodiment, information (the physical address page number 510 and the sequence number 540) for logical address to physical address translation and information (the state information 520 of the physical page and the logical address page number 530) for physical address to physical address state information may be separately managed.

The physical address-physical address state information may be very usefully used, in particular, when the garbage collector will find a block in which the number of invalid pages in the block is large. That is, when the physical address-physical address state information is not maintained but only the physical address mapped to the logical address and a state are managed, all corresponding information needs to be scanned once or more in order to find a physical block including an invalid page in the garbage collection.

However, when the physical address-physical address state information is managed, information is written according to the order of the physical addresses, and as a result, a desired physical block may be found while sequentially reading the physical blocks.

Figure 6:
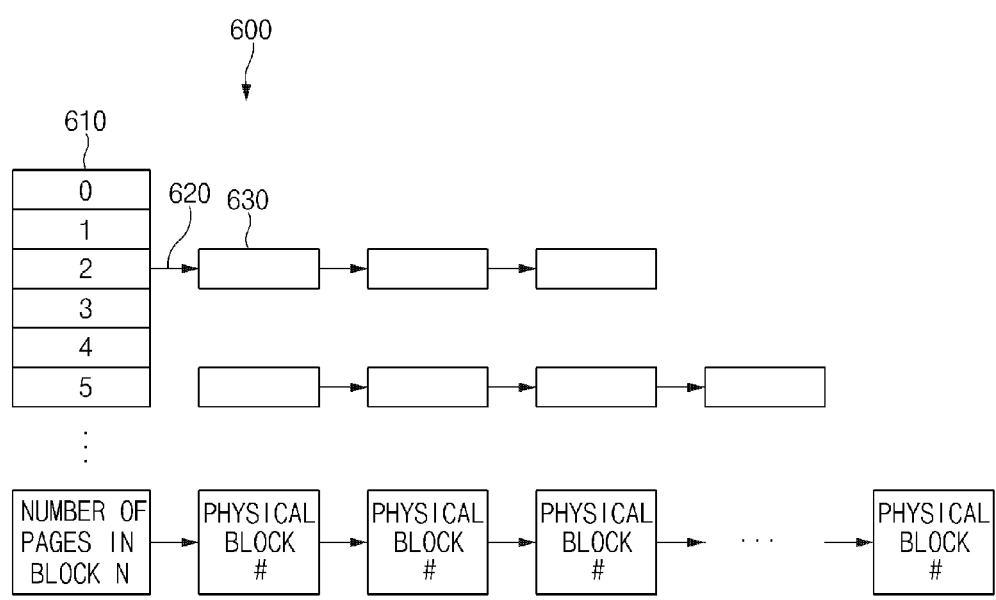
FIG. 6 is a diagram illustrating a physical block management structure depending on the number of invalidation pages in a block in the exemplary embodiment of the present invention.

FIG. 6 is a diagram illustrating a physical block management structure 600 depending on the number of invalid pages in a block in the exemplary embodiment of the present invention.

In the exemplary embodiment of the present invention, the structure of FIG. 6 may be stored in the memory 140 or 151 in the computing system 100 in order to more rapidly find a block which is a target of the garbage collection.

The physical block management structure 600 depending on the number of invalid pages in the block includes link information arrays 610 as many as the number of pages in the block+1. An index number of each array item represents the number of invalid pages. In each array item, a link 620 indicating a node 630 constituted by a physical block number and link information is set.

When there is no physical block corresponding to a corresponding array item, it is set as null. By such a method, blocks having invalid pages of a specific number are connected to each other through the link 620. When the garbage collection is required, through such a structure, the garbage collection may be performed from a block having the larger number of invalid pages in the reverse order of the index, thereby increasing efficiency.

Meanwhile, the physical block management structure 600 may be configured by scanning the mapping information 500 once when driving the flash memory system 130 and is continuously updated and maintained while operating the system.

Figure 7:
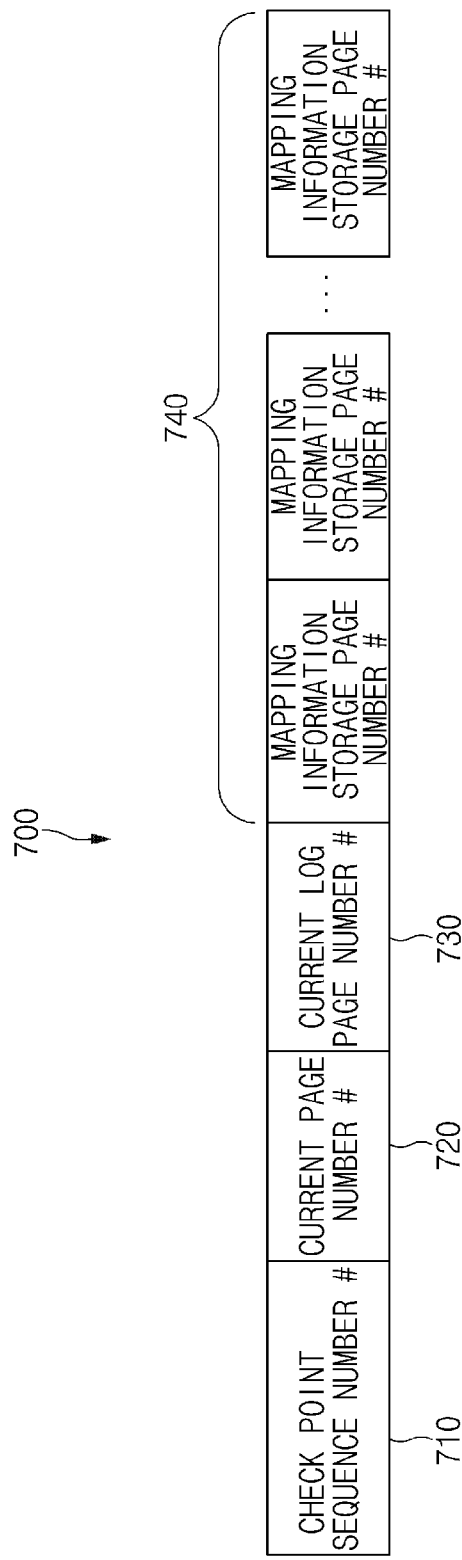
FIG. 7 illustrates a structure of a check point entry managed for each page in a check point region of FIG. 2.

FIG. 7 illustrates a structure of a check point entry 700 managed for each page in the check point region 210 of FIG. 2.

The check point entry 700 includes a checkpointing sequence number 710, a current page number 720, a current log page number 730, and one or more mapping information storage page numbers 740 in flash memories storing the mapping information 500 in the checkpointing operation.

When new checkpointing is started, unused or free page(s) for storing the mapping information 500 managed in the memory 140 or 151 are allocated. In addition, the mapping information 500 is written in the allocated page(s).

In this case, in the allocation of the page, the required number of consecutive pages may be received in the data region 220 at once or the pages may be allocated one by one. When the pages are allocated at once, only one mapping information storage page number 740 of FIG. 7 may be stored.

As one exemplary embodiment, a logical address of the corresponding physical page may adopt "0xffffffff . . . ff−1" as a special number in a mapping information entry for the pages allocated for storing the mapping information 500 by the checkpointing operation. The current page number 720 is a page number to be used when data writing is requested in the data region 220. The current log page number 730 is a page number representing a position where a log page is to be written in the metadata log region 230.

Figure 8:
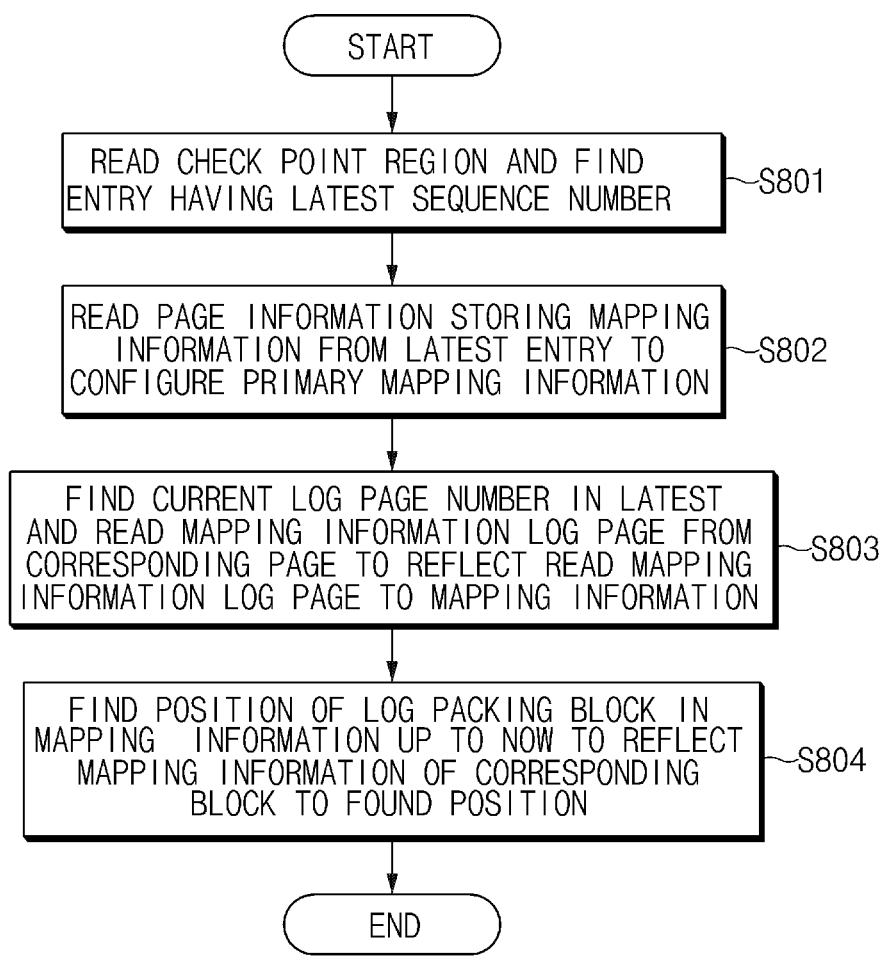
FIG. 8 is a flowchart describing an initial mapping information configuring process according to an exemplary embodiment of the present invention.

FIG. 8 is a flowchart describing an initial mapping information configuring process according to an exemplary embodiment of the present invention.

Referring to FIG. 8, the flash memory system 130 reads the check point region 210 and finds an entry having a latest sequence number in order to store the mapping information in the memory (S801). Thereafter, when a latest entry is found, page information storing the mapping information is read from corresponding entry information and a corresponding page content is read to configure primary mapping information (S802).

Next, the current log page number 730 is read from a latest check point entry in order to reflect mapping information changed after the checkpointing operation is started. In addition, the mapping information is changed until reaching the latest sequence number while reading a corresponding mapping information log page (S803).

Subsequently, a corresponding block is read by finding the position of the log packing block 300 in mapping information configured up to now in order to find mapping information which remains in the log packing block 300 because a mapping information change content may not fill one page. In addition, by reflecting the corresponding mapping information (S804) by comparing the sequence numbers, the flash memory stores all mapping information at a previous stop time.

Figure 9:
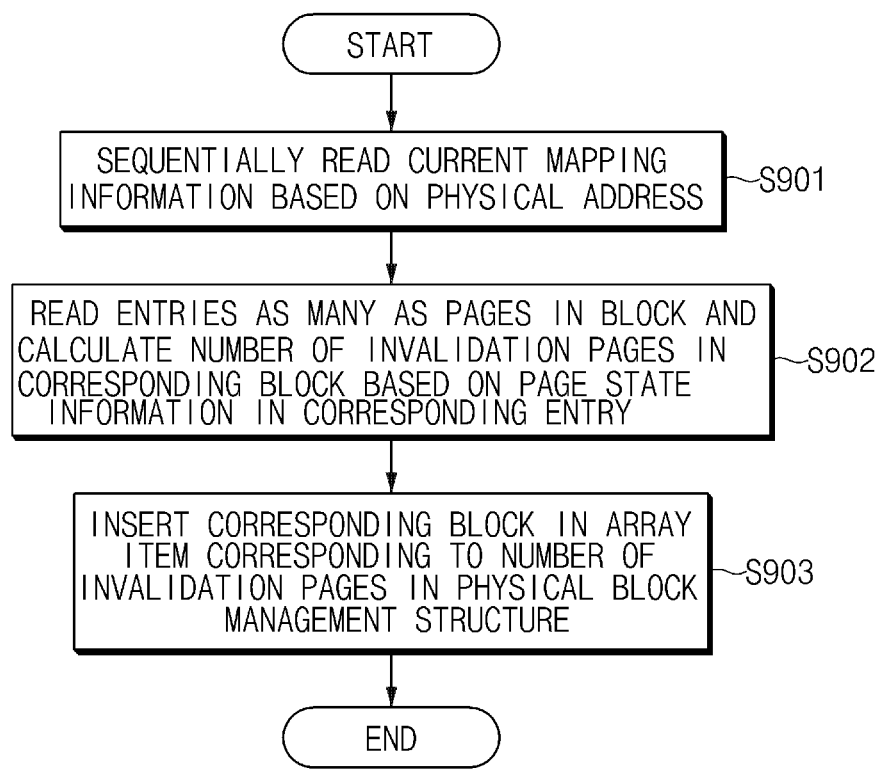
FIG. 9 is a flowchart describing a process of configuring the physical block management structure of FIG. 6.

FIG. 9 is a flowchart describing a process of configuring the physical block management structure of FIG. 6.

Referring to FIG. 9, current mapping information in the memory is read sequentially from a first entry based on the physical address (that is, by using the physical page number as the index) (S901). For entries as many as pages which may be present in the block, physical page state information in each entry is read and the number of invalid pages is counted (S902).

After the entries are read as many as the pages which may be present in the block, corresponding physical block information is inserted into an item of the link information array 610 of the physical block management structure 600 corresponding to the number of invalidation pages. Such a process is performed while reading up to the end of the mapping information to complete management of the physical block.

Figure 10:
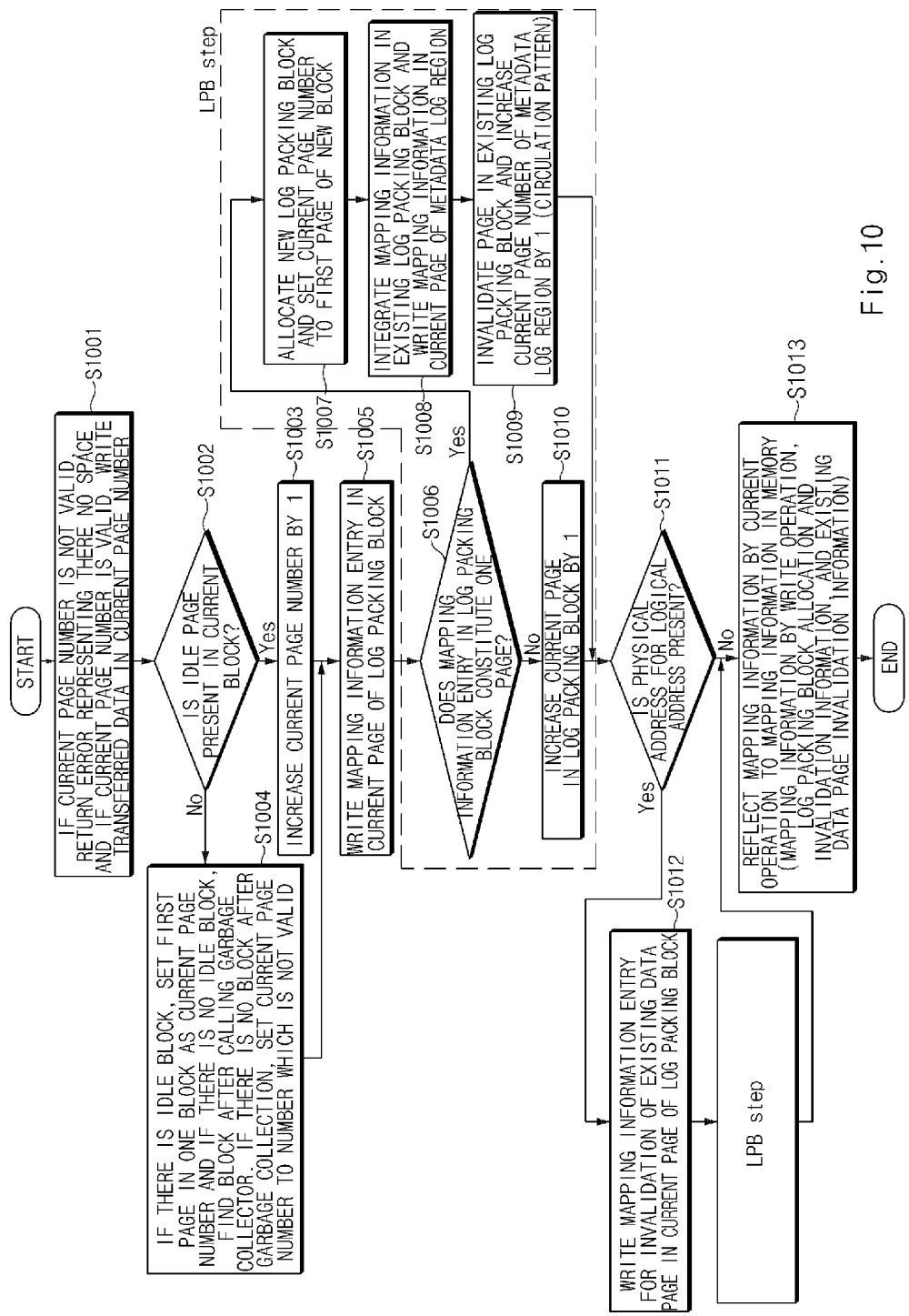
FIG. 10 is a flowchart describing a processing process in the case where storage clients request a storage service while providing a logical address to a flash memory system.

FIG. 10 is a flowchart describing a processing process in the case where storage clients 110 request a storage service (in particular, write or update) while providing a logical address to a flash memory system 130.

Referring to FIG. 10, first, data which is requested to be serviced is written in the current page number 730 (S1001). If the current page number 730 is an invalid number, there is no space in the flash memory, and as a result, an error notifying there is no space is returned.

It is checked whether there is an unused page in a block to which a currently written page belongs after data is written (S1002). If the unused page is present, the current page number 730 is increased by 1 (S1003). On the contrary, if there is no unused page, it is checked whether there is a new unused block.

In this case, if there is an unused block, one unused block is selected by considering that the unused block is used in fashion that the block number (alternatively, the page number) increases and the current page number 730 is set as a first page number in the corresponding block. On the contrary, if there is no unused block, calls garbage collector to reset invalidated blocks into unused blocks, and then checks whether there is any idle unused blocks again.

If there is an unused block, the current page number 730 is set according to the aforementioned method and if there is no unused block, an invalid number (for example, 0xffffffff . . . ffff−2) is set as the current page number (S1004). In the exemplary embodiment of the present invention, step S1004 is constituted by one step due to a spatial limit, but step S1004 may be actually constituted by various steps.

Thereafter, the mapping information entry 320 is written in the current page of the log packing block 300 in order to write the mapping information changed in the operation for writing the data (S1005). Then, it is determined whether the mapping information entries 320 in the log packing block 300 reach the number of mapping information entries 320 to constitute one page (S1006). The corresponding determination may distinguish whether the current page number 730 reaches the number of mapping entries which may be written in one page.

When one page may be constituted in step S1006, the log packing block 300 is allocated for next operation and the current page number 730 is set as the first page number of the new log packing block 300 (S1007). As yet another exemplary embodiment, when two or more log packing blocks 300 are allocated, a first block among unused log packing blocks 300 is subjected to allocation.

Thereafter, the mapping information entries 320 in the existing log packing block 300 are integrated to configure one page size and thereafter, written at a current page position of the metadata log region 230 (S1008). In addition, pages in the existing log packing block 300 are invalidated and the current page number 730 of the metadata log region 230 is increased by 1 (S1009). In this case, pages in the metadata log region 230 may be used in a circulation pattern.

When the mapping information entries 320 do not constitute one page in the determination step S1006, the current page number in the log packing block 300 is increased by 1 (S1011).

Thereafter, it is checked whether physical address mapping information to a given logical address has already been present in order to determine whether the data writing request of the storage client 110 is updating the existing data (S1012). As a checking result, when the data writing request is not the updating, changing the mapping information is not required any longer, and as a result, the mapping information on the data writing page is changed to be reflected to the mapping information maintained in the memory (S1013).

If the data writing request is updating the existing data as the checking result, invalidation information is written in the current page of the log packing block 300 in order to write invalidation information on the existing page (S1012). In addition, after performing a step (LPB step) of further performing the work depending on whether the information in the log packing block 300 configures one page, the mapping information maintained in the memory is changed (S1013).

In the step of changing the mapping information in the memory (S1013), the mapping information includes mapping information by writing new data, log packing block allocation and invalidation information, and existing data page invalidation information.

Figure 11:
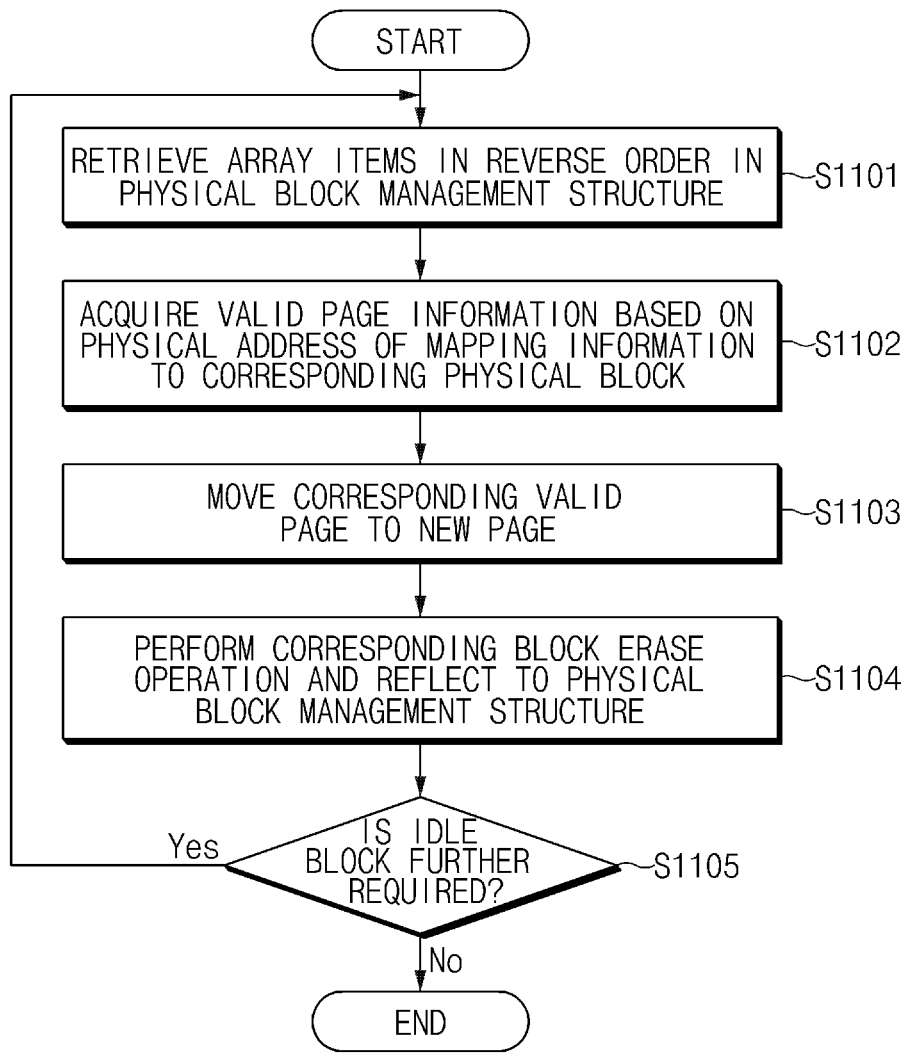
FIG. 11 is a flowchart describing a step of garbage collection in the exemplary embodiment of the present invention.

FIG. 11 is a flowchart describing a step of performing garbage collection in the exemplary embodiment of the present invention. The process of collecting the garbage according to the exemplary embodiment of FIG. 11 may be performed by using the physical block management structure 600 illustrated in FIG. 6.

First, in the physical block management structure 600, the items of the link information array 610 is retrieved in the reverse order, that is, from an item having the larger number of invalidation pages (S1101). A valid page list in the corresponding block is attained by using a physical address of mapping information in a memory for a physical block which is first found as the index (S1102).

The attained valid page(s) is(are) copied to a new unused page (S1103). In this case, corresponding mapping information changes are written in the log packing block 300. When the movement is completed, the corresponding physical block is erased, and as a result, the corresponding block is erased from the physical block management structure 600 and thereafter, added to item entry No. 0 (S1104).

If it is judged whether the unused blocks reaches a predetermined desired level (S1105), the operation is stopped and if not, the process returns to step S1101 to continuously perform the garbage collecting operation. The garbage collecting process may be periodically performed independently from other works. Further, the number of unused blocks may be designated to be at a predetermined level depending on the system. Further, the number of unused blocks may be dynamically adjusted according to a situation of the system.

In the above description, efficient address translation for the flash memory device 150 has been described.

Meanwhile, at present, a plurality of companies provides various types of flash memory devices or systems. The respective flash memory devices provide the storage service by using different address translation methods. As a result, different types of flash memory devices provide different performances, stabilities, and life-span levels.

In yet another exemplary embodiment of the present invention, the aforementioned address translation method is applied to the existing flash memory devices to improve characteristics such as the performance, the stability, and the life-span.

In more detail, a logical address space which the existing flash memory device provides through an address translation method by itself is handled as the physical address handled in the aforementioned address translation method of the present invention and a new virtual driver is added to the existing flash memory device to provide a new logical address. Therefore, yet another exemplary embodiment of the present invention may further improve the performance, the stability, and the life-span of the existing flash memory device.

The existing logical volume manager serves to provide one large logical storage device (also referred to as a logical volume) by collecting two or more storage devices by applying various redundant array of inexpensive disks (RAIDs) levels according to the usage.

However, if two or more respective devices constituting one large logical volume have different performances, stabilities, and life-spans, a plurality of problems may occur in using the corresponding logical volume.

In order to solve such a problem, yet another exemplary embodiment of the present invention performs 2-stage address translation through the virtual driver to improve the performance, stabilities, and life-spans of the respective storage devices constituting the logical volume to be similar to each other.

Figure 12:
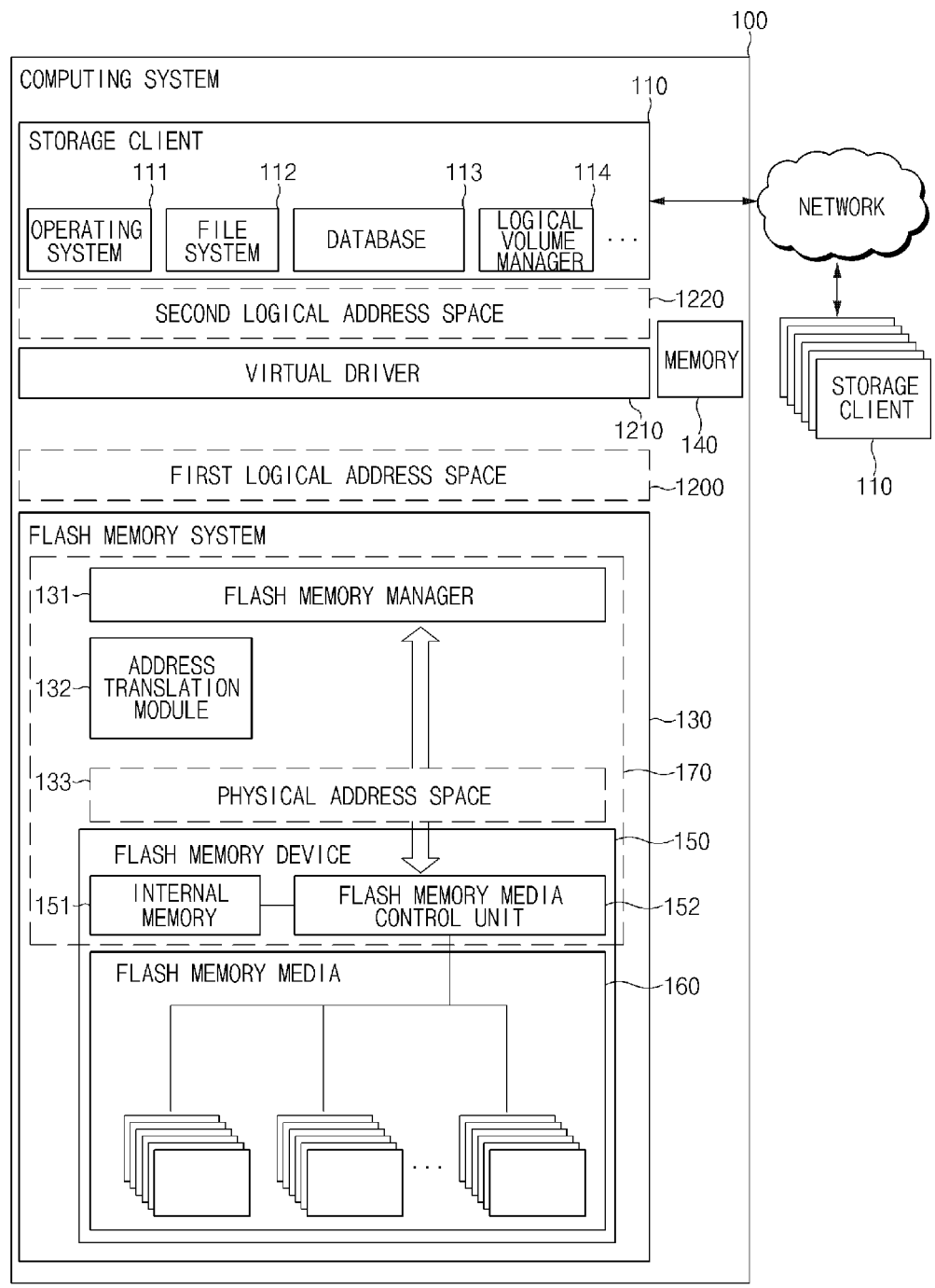
FIG. 12 is a configuration diagram of an address translation system for a flash memory device according to another exemplary embodiment of the present invention.

Meanwhile, FIG. 12 is a configuration diagram of a system for address translation for a flash memory device according to another exemplary embodiment of the present invention. The exemplary embodiment of FIG. 12 provides a virtual device driver through the 2-stage address translation.

FIG. 12 additionally includes a first logical address space 1200, a second logical address space 1220, and a virtual driver 1210 as compared with the configuration of FIG. 1. The logical address space 120 of FIG. 1 becomes the first logical address space 1200 in the exemplary embodiment of FIG. 12. The first logical address space 1200 is a logical address space which the flash memory device 150 or the flash memory system 130 provides to the outside through the address translation process.

The virtual driver 1210 according to the exemplary embodiment of the present invention translates the first logical address space 1200 to a new second logical address by applying the address translation method of the present invention to provide the second logical address to the storage clients 110. In this case, the virtual driver regards the first logical address space 1200 as the physical address. Therefore, the virtual driver 1210 may further enhance characteristics such as performance, stability, and life-span of the flash memory device 150 or the flash memory system 130.

Meanwhile, in the address translation process through the virtual driver 1210, the first logical address space 1200 has a different characteristic from the physical address space 133 handled in the address translation method of the present invention described above. That is, since the corresponding first logical address space 1200 is not the physical space of the flash memory, the erase operation may not be performed. Instead, a trim command to notify that a current page is an invalidated page may be used so as for the flash memory device 150 or the flash memory system 130 to perform the erase operation.

By considering this point, the 2-stage address translation process through the virtual driver 1210 which is yet another exemplary embodiment of the present invention may be provided by modifying the basic address translation process described above into a method described below.

That is, when a specific page is invalidated, in order to notify the invalidation of the specific page to the flash memory system 130, transmits a trim command for the corresponding page to the flash memory system 130 so as to perform the erase operation afterwards.

Herein, different methods may be provided depending on the time of transmitting the trim command.

In a first method, the trim command is transmitted immediately whenever the page is invalidated. In this case, since the trim command needs not to be transmitted afterwards, the mapping information index 550 in the mapping information 500 of FIG. 5 need not to be retrieved based on the physical address of the first logical address space 1200. Therefore, the state information 520 of the physical page and the logical address page number 530 may be removed from the entry structure of the mapping information 500 of FIG. 5.

Since information on the number of invalidation pages for each physical block in the first logical address space 1200 is not required, the physical block management structure 600 of FIG. 6 needs not to be maintained. Further, the garbage collection work is also removed.

However, in the exemplary embodiment of FIG. 12, a list of unused pages needs to be maintained in order to find an unused page more easily when a new page is needed. One exemplary embodiment of the list of the unused pages may be maintained in a format to connect page numbers in a link structure.

In a second method, the trim command is performed at once by collecting the corresponding pages afterwards instead of performing the trim command whenever the page is invalidated. This case is a method of the same type as the garbage collection in the basic address translation method. However, both methods are different from each other only in that the trim command for each page is performed instead of the erase operation for each block.

If the flash memory system 130 to be applied supports not block-level address translation but page-level address translation, the 2-stage address translation method may be modified to enhance further with the page-level address translation. If the flash memory system 130 provides the page-level address translation, the page in the first logical address space 1200 is not an actual physical flash memory page, and as a result, multiple writing is available in the page.

That is, in the case of a block-level address translation flash, a change in the page influences entire block, and thus makes the flash performance to be degraded. On the contrary, in the case of a page-level address translation flash, since overwriting is performed by allocating a new page, only a corresponding page is influenced. Accordingly, the log packing block 300 of FIG. 3 in the basic address translation process presented in the present invention may be removed.

Meanwhile, in yet another exemplary embodiment of the present invention, the logical volume manager that configures and provides one logical volume by collecting two or more different flash memory devices may apply the basic address translation method directly with one stage instead of applying the 2-stage address translation method to provide the logical volume.

What is claimed is:

1. An address translation system for a flash memory device, comprising:
   a flash memory system writing a data page by allocating a physical address of a physical address space when there is a request for writing the data page from a storage client among storage clients, and performing address translation between the physical address and a logical address of a logical address space, the logical address space being formed between the flash memory system and the storage client to provide the logical address; and
   the physical address space including a data region writing and extracting data requested from the storage client and storing mapping information and a check point region managing a writing position of mapping information and a sequence number, one or more blocks being allocated to the check point region so that the writing position of the mapping information and the sequence number are written to a page included in the one or more blocks while the page is sequentially circulated at each checkpointing operation,
   wherein the allocating allocates a new physical address when the storage client requests a writing operation associated with the logical address and the address translation manages a correspondence relationship between the new physical address and the logical address, and wherein the data region includes a log packing block writing one mapping information entry for each page.

2. The address translation system of claim 1, further comprising:
   a memory storing metadata and mapping information for the address translation.

3. The address translation system of claim 2, wherein the mapping information includes at least one of a mapping information index, a physical address page number, state information of a physical page, and a logical address page number.

4. The address translation system of claim 2, wherein the memory includes a physical block management structure in which a number of invalidation pages is configured by a link information array.

5. The address translation system of claim 1, wherein the flash memory system includes:
   a flash memory device including a plurality of flash memory media; and
   a flash memory manager controlling translation between the logical address and the physical address and managing metadata for mapping.

6. The address translation system of claim 5, wherein the flash memory device includes:
   a flash memory media controller managing the plurality of flash memory media; and
   an internal memory storing metadata and mapping information used in the flash memory media controller and the flash memory manager.

7. The address translation system of claim 1, wherein the physical address space further includes:
   a metadata log region writing the mapping information in a log format in response to the request for writing of the data page.

8. The address translation system of claim 7, wherein the check point region includes at least one of a checkpointing sequence number, a current page number, a current log page number, and a mapping information storage page number.

9. The address translation system of claim 7, wherein a size of the metadata log region is dynamically changed so as to perform wear-leveling by using a number of invalidation pages and the number of unused pages in the data region.

10. The address translation system of claim 1, wherein when the mapping information entries are collected to reach one page size, corresponding mapping information entries are written in the metadata log region as one page.

11. The address translation system of claim 1, wherein when corresponding mapping information entries are written in the metadata log region, corresponding log packing block is invalidated by garbage collection.

12. The address translation system of claim 1, wherein the mapping information entry includes at least one of a physical address page number, state information of a physical page, and a logical address page number.

13. The address translation system of claim 1, wherein the flash memory system further performs wear-leveling for a metadata region included in the physical address space by sequentially allocating empty pages.

14. An address translation system for a flash memory device, comprising:
   a flash memory system writing a data page by allocating a physical address of a physical address space when there is a request for writing the data page from a storage client among storage clients, and performing address translation between a physical address and a logical address;
   the physical address space including a data region writing and extracting data requested from the storage client and storing mapping information and a check point region managing a writing position of mapping information and a sequence number, the one or more blocks being allocated to the check point region so that the writing position of the mapping information and the sequence number are written to a page included in the one or more blocks while the page is sequentially circulated at each checkpointing operation,
   a virtual driver transmitting a trim command for a corresponding page to the flash memory system when a specific page is invalidated and translating a logical address of a first logical address space to a logical address of a second logical address space by regarding the first logical address space as the physical address space to provide the logical address of the second logical address space of the storage client, wherein the allocating allocates a new physical address when the storage client requests a writing operation associated with the logical address and the address translation manages a correspondence relationship between the new physical address and the logical address, and wherein the data region includes a log packing block writing one mapping information entry for each page.

15. The address translation system of claim 14, wherein the trim command is transmitted to the flash memory system whenever the page is invalidated.

16. The address translation system of claim 14, wherein the trim command is transmitted to the flash memory system when corresponding invalidated pages are collected.

17. An address translation method for a flash memory device, comprising:

writing data requested to be serviced from a storage client in a current page corresponding to a current page number of a data region and increasing the current page number when there is an unused page in a block to which the current page in which the data is written belongs;

writing a mapping information entry associated with the data in a current log packing block page in a log packing block and setting a first page number in a new log packing block to a current log packing block page when a plurality of mapping information entries in the log packing block constitute one page;

writing the plurality of mapping information entries as one page in a current page of a metadata log region by integrating the plurality of mapping information entries; and invalidating a plurality of pages in the log packing block and increasing a current page number of the metadata log region.

18. The address translation method of claim 17, further comprising:

judging whether there is a physical address for a logical address and writing a mapping information entry for data invalidation in the current log packing block page of the log packing block provided there is the physical address reflecting mapping information by a current operation to mapping information provided there is no physical address.

* * * * *